Nov. 17, 1942.  W. J. GAZEY  2,302,115

APPARATUS FOR MAKING BRANCH-FITTING BLANKS

Filed Sept. 26, 1938  4 Sheets-Sheet 1

Inventor
William J. Gazey
By Seymour Earle Nichol
Attorneys

Nov. 17, 1942.    W. J. GAZEY    2,302,115
APPARATUS FOR MAKING BRANCH-FITTING BLANKS
Filed Sept. 26, 1938    4 Sheets-Sheet 2
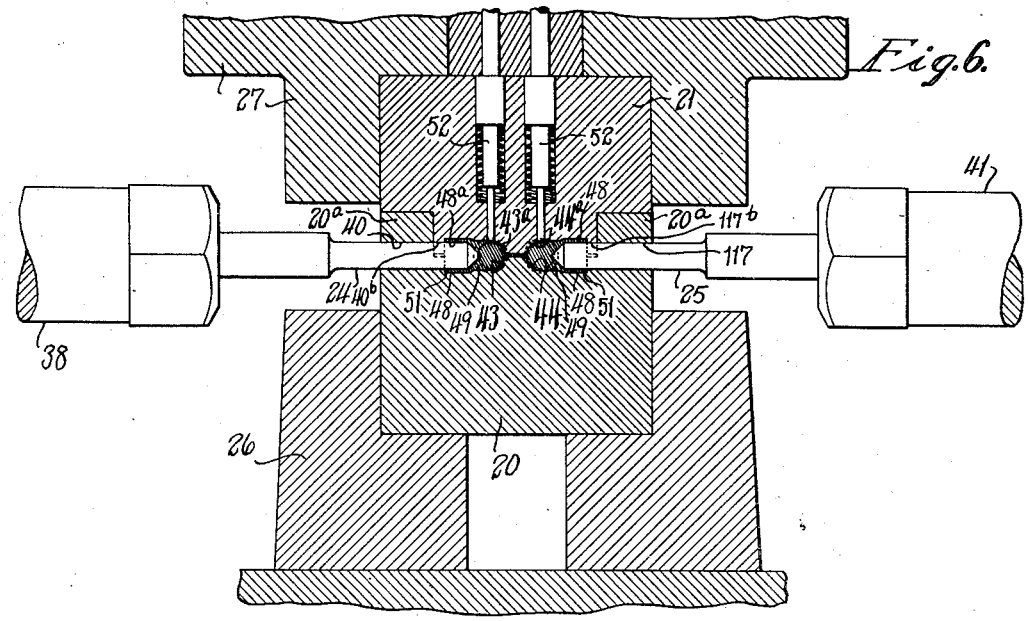
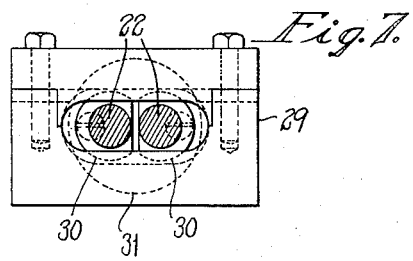
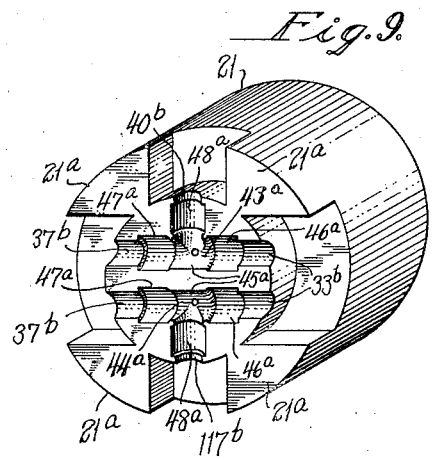
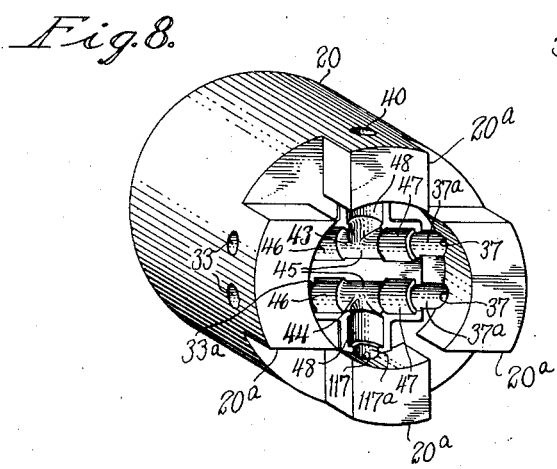
Inventor
William J. Gazey
Seymour Earl Nichols
Attorneys Nov. 17, 1942.  W. J. GAZEY  2,302,115
APPARATUS FOR MAKING BRANCH-FITTING BLANKS
Filed Sept. 26, 1938  4 Sheets-Sheet 3

Inventor
William J. Gazey
By Seymour Earle Nichols
Attorneys

Nov. 17, 1942.    W. J. GAZEY    2,302,115
APPARATUS FOR MAKING BRANCH-FITTING BLANKS
Filed Sept. 26, 1938    4 Sheets-Sheet 4

Inventor
William J. Gazey
By Seymour Earl Nichols
Attorneys

Patented Nov. 17, 1942

2,302,115

UNITED STATES PATENT OFFICE 2,302,115

APPARATUS FOR MAKING BRANCH-FITTING BLANKS

William J. Gazey, Waterbury, Conn., assignor to Chase Brass & Copper Co., Incorporated, Waterbury, Conn., a corporation Application September 26, 1938, Serial No. 231,657

3 Claims. (Cl. 78—18)

This invention relates to improvements in methods and apparatus for making branch-fitting blanks, and more particularly for making branch-fitting blanks by forging.

One object of this invention is to provide an improved method of making branch-fitting blanks with minimum waste of metal.

Another object of this invention is to provide an improved method of making a greater number of branch-fitting blanks by an operator in a given unit of time.

Other objects of this invention are to provide improved apparatus for carrying out the foregoing methods.

With the above and other objects in view, as will appear to those skilled in the art from the present disclosure, this invention includes all features in the said disclosure which are novel over the prior art.

In the accompanying drawings, in which one way of carrying out the invention is shown for illustrative purposes:

Fig. 6 is a vertical sectional view on line 6—6 of Fig. 4;

Fig. 7 is a vertical sectional view on line 7—7 of Fig. 2;

Fig. 8 is a perspective view of the lower die-member;

Fig. 9 is a perspective view of the upper die-member;

Figure 1:
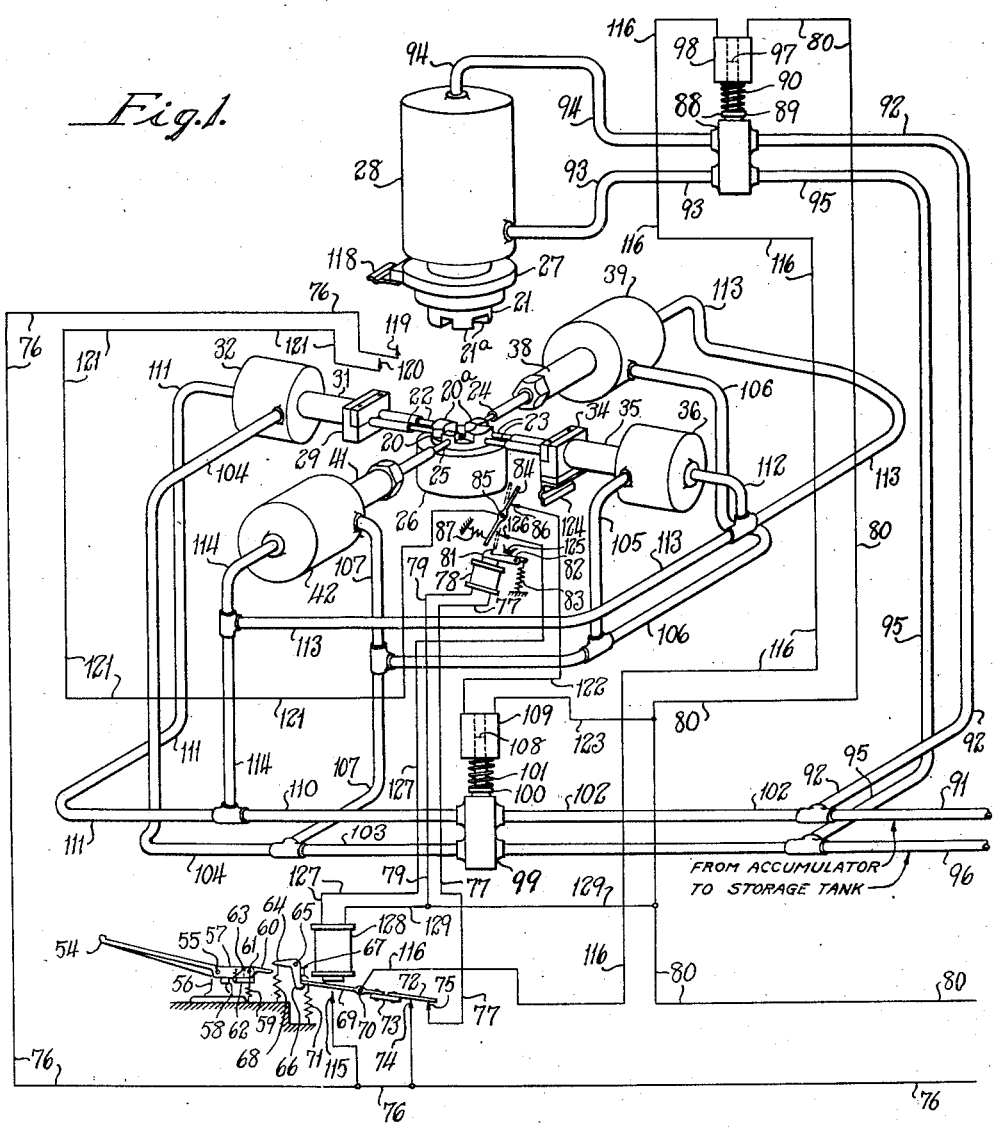
Fig. 1 is a diagrammatic view, mainly in perspective, illustrating one way of carrying out the invention.

In the description and claims, the various parts and steps are identified by specific names for convenience, but they are intended to be as generic in their application as the prior art will permit.

The particular form of forging apparatus chosen for illustration in the drawings omits the frame for clearness, and includes lower and upper forging die-members 20 and 21, horizontal pairs of mandrels or plungers 22 and 23, and horizontal single mandrels or plungers 24 and 25. The lower die-member 20 is fixed in the bed 26 of the forging apparatus. The upper die-member 21 is carried by a forging-ram 27 mounted to travel down and up in a hydraulic cylinder 28, so that the upper die-member 21 can be forced downwardly into engagement with the lower die-member 20 and withdrawn therefrom again to the upper position shown in Figs. 1 and 2. The lower die-member 20 has guide-blocks 20a integral therewith and adapted to have interfitting sliding engagement with the guide-blocks 21a integral with the upper die-member 21, thus providing the die-members 20 and 21 with means which maintain the die-members 20 and 21 in alignment during the forging operation. The end edges of the guide-blocks 20a and 21a will preferably be rounded or chamfered to ensure the proper entrance of the blocks 21a into interfitting engagement with the blocks 20a when the die-member 20 is lowered during the forging operation. Also, the ram 27 may be provided with any suitable or known means to hold the ram 27 from rotating, so it will always move in a proper line of travel.

The mandrels 22 are each mounted in a ram-head 29 with a certain amount of freedom of vertical and horizontal components of movement in the ram-head and each has an enlarged thrust-end 30 which prevents withdrawal of the mandrel from the ram-head. Ram-head 29 is secured to a ram 31, which ram 31 is mounted in a hydraulic cylinder 32 adapted to force the ram 31 and mandrels 22 toward and from the die-members 20 and 21. A guide-block 20a of the lower die-member 20 has a pair of holes or mandrel-guide or bearing-passages 33 for the die-ends of the mandrels 22. The mandrels 23 are similarly mounted in a ram-head 34 secured in turn to the ram 35 mounted in a hydraulic cylinder 36 and adapted to be forced toward and from the pair of die-members 20 and 21 in opposition to the mandrels 22, through mandrel-guide passages 37 in a guide-block 20a of the lower die-member 20. Mandrel 24 is mounted on a ram 38 mounted in a hydraulic cylinder 39 to be forced back and forth toward and from the pair of die-members 20 and 21, with the end of the mandrel 24 mounted in mandrel-guide passage 40 in a guide-block 20a of the lower die-member 20. Mandrel 25 is similarly mounted on the end of ram 41 mounted in cylinder 42 for movement toward and from die-members 20, 21, with the end of the mandrel 25 mounted in guide-passage 117 in a guide-block 20a of the lower die-member 20.

The lower die-member 20 has two adjacent three-terminal branch-fitting forming-cavities, generally designated by numerals 43 and 44, each including body-line- and branch-terminal-cavity portions 45, 46, 47 and 48 respectively, complemental to correspondingly-numbered forming-cavities and cavity-portions 43a, 44a, 45a, 46a, 47a, 48a in the upper die-member 21. Half-round recesses 33a, 37a, 40a and 117a in the lower die-member 20 are mandrel-guide or bearing-passages which form aligned extensions respectively of the lower halves of the mandrel-guide or bearing-passages 33, 37, 40 and 117. And the half-round recesses 33b, 37b, 40b and 117b in the upper die-member 21 are mandrel-guide or bearing-passages which are respectively complemental to passages 33a, 37a, 40a and 117a, and form extensions respectively of the upper halves of the mandrel-guide or bearing-passages 33, 37, 40 and 117 of the lower die-member 20 when the two die-members are brought into closed or abutting relation with one another. Thus the pairs of half-round passages 33a, 33b; 37a, 37b; 40a, 40b and 117a, 117b form cylindrical holes or mandrel-guide or bearing-passages which respectively form aligned extensions of the holes or mandrel-guide or bearing-passages 33, 37, 40 and 117 when the die-members are abutted together ready for the mandrels to complete the formation of the terminals of the blank as hereinafter described.

Figure 2:
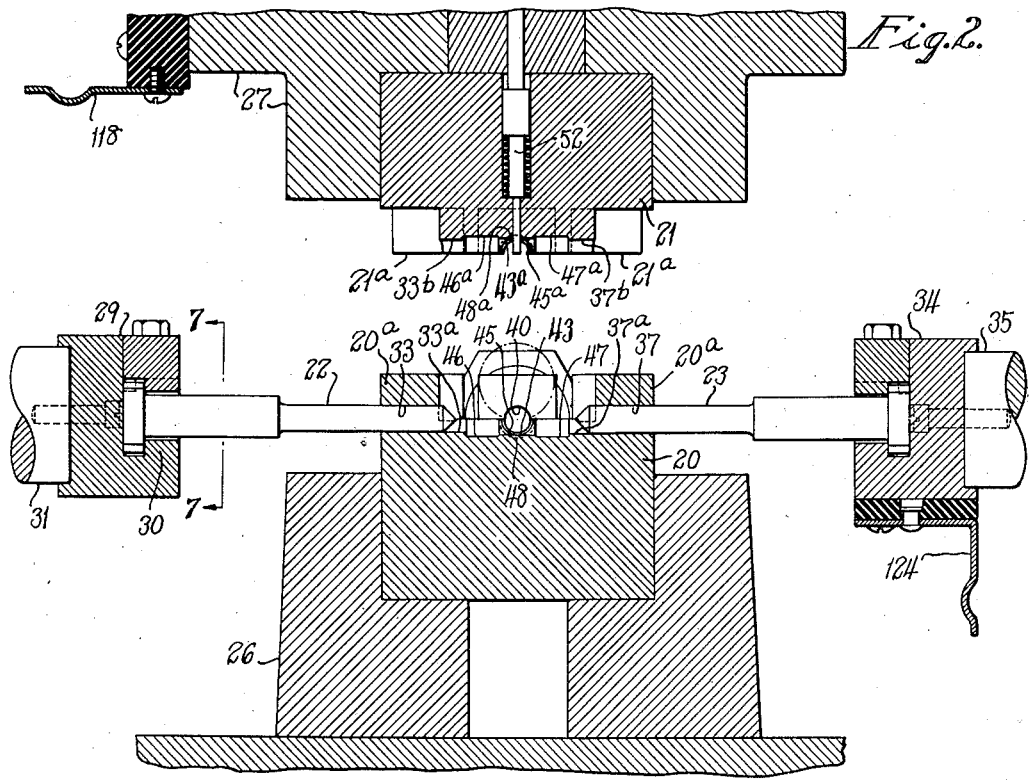
Fig. 2 is a vertical sectional view on line 2—2 of Fig. 5, of a pair of die-members and the piercing-mandrels prior to the upper die-member being moved down into engagement with the lower die-member and prior to the mandrels being moved into terminal-forming position.
Figure 3:
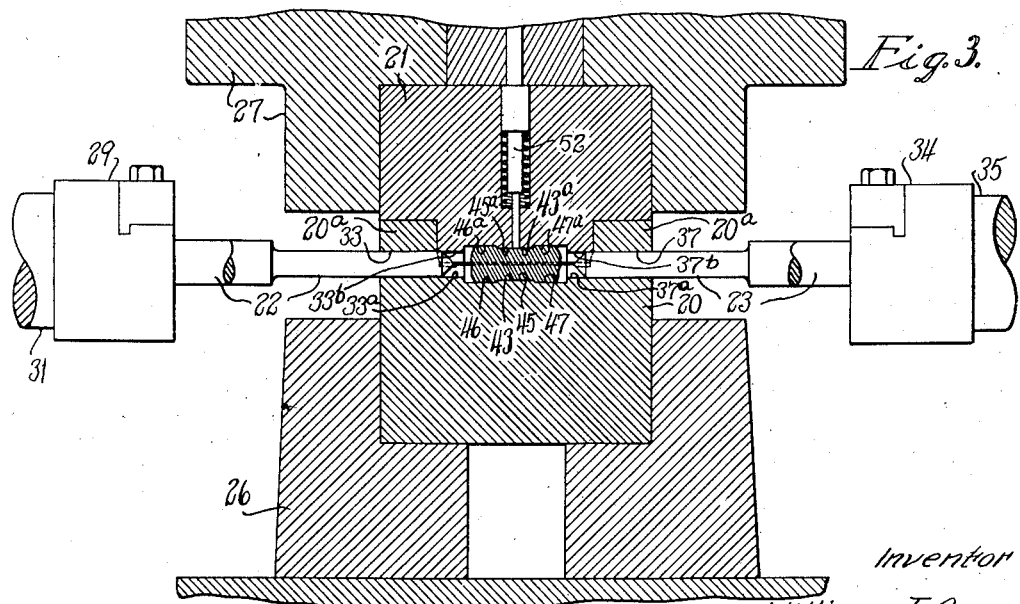
Fig. 3 is a view similar to Fig. 2 with the upper die-member shown moved down into engagement with the lower die-member to perform the first step of the forging operation upon a billet of metal to partly form a forged blank.

With the die-members 20, 21 in a position such, for example, as is illustrated in Fig. 2, a cylindrical slug or billet of metal which may, for example, be copper or high-copper alloy, is placed in the position indicated by the broken-line outline, the said billet extending partly across the two forming-cavities 43 and 44 of the lower die-member 20 in suitably-heated condition for forging, whereupon the upper die-member 21 is caused to move down to the position shown in Fig. 3, which forces the billet of metal between the die-members 20 and 21 to form a blank as shown in Fig. 3 which is complete except as to the terminals, the terminals being completed in a manner hereinafter described. The horizontal mandrels 22, 23, 24 and 25 are thereupon caused to move inward toward the center of the die-members 20 and 21 to the positions indicated in Figs. 4, 5 and 6, thus completing the formation of a double branch-fitting blank 49 by completing the hollow line-terminals 50 and hollow branch-terminals 51. Thereupon, the mandrels 22, 23, 24 and 25 are caused to be withdrawn from the die-members 20 and 21 and the upper die-member 21 is caused to be raised to its original position, shown in Fig. 2, and the knockout-plungers 52 knock the double branch-fitting blank 49 out of the upper die-member 21. The mandrels 22, 23, 24 and 25 are preferably of diameters to form the terminal-openings to the approximate sizes to be used in the finished fitting.

Figure 10:
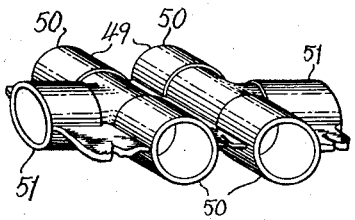
Fig. 10 is a perspective view of a forged blank containing two branch-fitting blanks.
Figure 11:
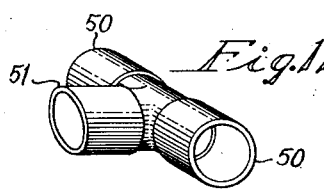
Fig. 11 is a perspective view of a completed branch-fitting or T made from one of the branch-fitting blanks shown in Fig. 10.

After the blank is removed from the die, another slug or billet of metal can be inserted between the dies, and the operation repeated, to make as large a quantity of blanks as is desired. The double blank 49 shown in Fig. 10 is then submitted to a trimming operation which cuts away the flash and connecting-web of the two branch-fitting blanks or blank-elements. Each branch- or T-blank element is submitted to boring operations to remove the solid central portion 53, so that the line- and branch-terminals are all connected with one another by passages, as is usual in branch-fittings. Also, in order to make the line- and branch-fitting openings of correct size, these may be subjected to a sizing-tool which reams or bores or drills the line- and branch-openings to exact size for sweating or soldering to tubes or pipes, preferably only removing a slight amount of metal, if any, in order to accomplish this sizing operation.

In the particular mechanism diagrammatically illustrated in Fig. 1 for operating the various hydraulic rams, electrical control-mechanism has been indicated, although it will be appreciated that mechanical control-mechanism could be used instead.

In order to carry out the forging operations heretofore described, a foot-pedal 54 is pivoted at 55 to a floor-support 56 and normally has its arm 57 held in engagement with the limit-block 58 carried by the floor-support 56 by a spring 59. An operating-finger 60 is pivoted at 61 to the arm 57 and has an arm 62 adapted to engage the under-side of the arm 57 and to be held in contact thereagainst either by the weight of the finger 60 or by means of a spring 63. A bell-crank latch-member 64 is pivoted at 65 and normally has its downwardly-extending latch-arm 66 held against the limit-block 67 by means of a spring 68. A metal switch-bar 69 is pivoted at 70 and is pulled downwardly by a spring 71 against the latch-face of the latch-arm 66. A switch-bar section 72 is secured in spaced relation to the switch-bar 69 by means of the insulation-block 73. In the positions of the parts shown in Fig. 1, the switch-bar section 72 electrically connects the switch-contacts 74 and 75, thereby transmitting electric current from the power-line wire 76 through the parts 74, 72, wire 77 which leads to electromagnet 78 and thence through wire 79 to the other power-line wire 80, thus completing the circuit through the electromagnet 78 and drawing the latch-arm 81 back to the position shown in Fig. 1 on its pivot 82 against the action of the spring 83. With the latch-arm 81 held in the position shown in Fig. 1 by the electromagnet 78, the switch-bar 84 is held against electric contact 86 by means of the spring 87.

A hydraulic valve, generally designated 88, has a valve-plunger 89 which, when held in the lowered position shown in Fig. 1 by the spring 90, causes liquid under hydraulic pressure to be transmitted from the accumulator-pipe 91 through the pipe 92, through the valve 88, through the pipe 93 to the lower end of the cylinder 28, to thus cause the ram 27 to be held or moved to its uppermost position, as shown in Fig. 1, the liquid from the other end of the cylinder 28 passing out the upper end of the cylinder 28 and through the pipe 94, through the valve 88, through the pipe 95 and thence to the storage-tank pipe 96. Connected to the upper end of the valve-plunger 89 is a magnetic-core 97 adapted to move in a core-opening of a solenoid-coil 98. When an electric current is passed through the solenoid-coil 98, the magnetic-core 97 is drawn upward against the action of the spring 90 to thus raise the valve-plunger 89, to thus pass hydraulic pressure from the pipe 92 through the valve 88, through the pipe 94, to the upper end of the cylinder 28, to thus cause the ram 27 to be moved downward, liquid being exhausted from the lower end of the cylinder 28 out through the pipe 93, through the valve 88, through the pipe 95 to storage-tank pipe 96.

A hydraulic valve, generally designated 99, has a valve-plunger 100 normally held pressed down as shown in Fig. 1 by a spring 101 to cause hydraulic pressure to be transmitted from the accumulator-pipe 91 through the pipe 102, through valve 99, through pipe 103, through branch-pipes 104, 105, 106 and 107 respectively leading to the inner ends of hydraulic cylinders 32, 36, 39 and 42, to thus hold or cause the rams 31, 35, 38 and 41 to be moved to their outward positions, to withdraw the mandrels 22, 23, 24 and 25 furthest from the center of the die-members 20 and 21, liquid being exhausted from the other ends of cylinders 32, 36, 39 and 42 similar to the way described concerning cylinder 28. A magnetic-core 108 is secured to the valve-plunger 100 and is adapted to move in a central opening in the solenoid-coil 109. When electric current passes through the solenoid-coil 109, the magnetic-core 108, together with the valve-plunger 100, is drawn upward against the action of the spring 101, to thus cause hydraulic pressure to pass from the pipe 102 through the valve 99, through a pipe 110, through pipes 111, 112, 113 and 114, to thus cause the rams 31, 35, 38 and 41 to be moved inward to force the mandrels 22, 23, 24 and 25 toward the center of the die-members 20 and 21, the valve 99 at the same time causing the hydraulic cylinders to be exhausted through the pipes 104, 105, 106 and 107 back through the pipe 103 to the storage-tank pipe 96.

In operation, assuming the parts to be in the position shown in Figs. 1 and 2, when the operator presses down on the foot-pedal 54, the finger 60 moves upwardly and engages the horizontal arm of the latch 64 and swings the latter upwardly against the action of the spring 68 to cause the latch-arm 66 to swing to the left and release the switch-bar 69 which is thereupon drawn down by the spring 71 into contact with a switch-contact 115, with the result that electric current passes from the power-line wire 76, through the contact 115, through the switch-bar 69, wire 116, solenoid-coil 98, to line-wire 80 thus causing solenoid 98 to draw the core 97 of the solenoid upward against the action of the spring 90 to thus shift the valve-plunger 89 to thus cause the ram 27 to move downward and bring the contact-arm 118 carried by the ram 27 into contact with the contact-members 119 and 120, whereupon the circuit is completed from the wire 76, through the contact-elements 119, 118, 120, wire 121, pivot 85, switch-bar 84, contact 86, wire 122, solenoid-coil 109 and through the wire 123 to the line-wire 80. At the time the electric contacts 119, 118, 120 are engaged, the two die-members 20 and 21 have come together to perform the first step of the forging operation.

Figure 4:
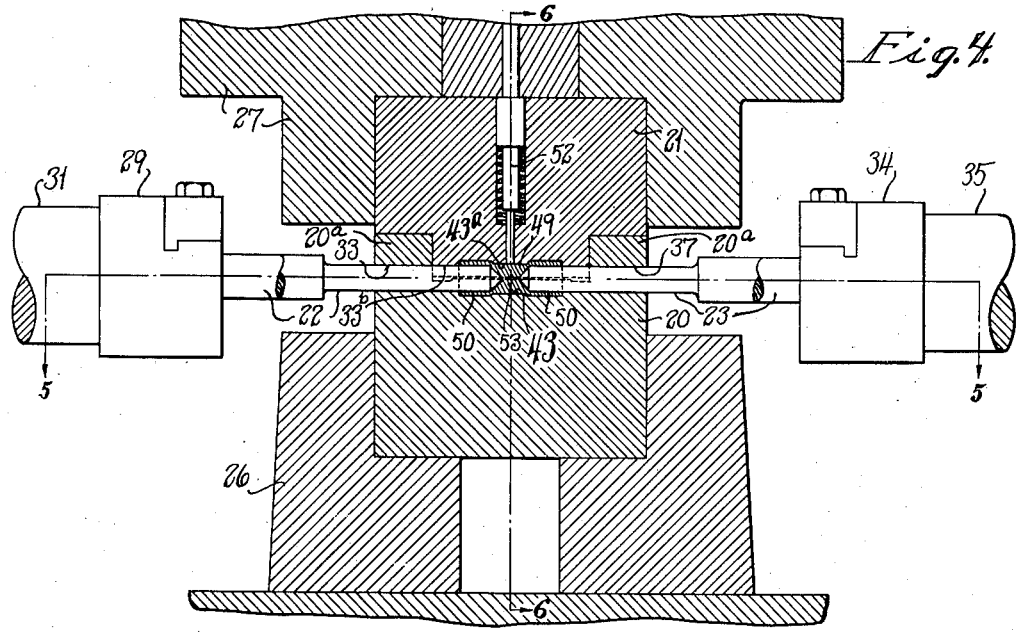
Fig. 4 is a view similar to Fig. 3, with the piercing-mandrels moved into the positions they occupy after having pierced the terminals of the blank.
Figure 5:
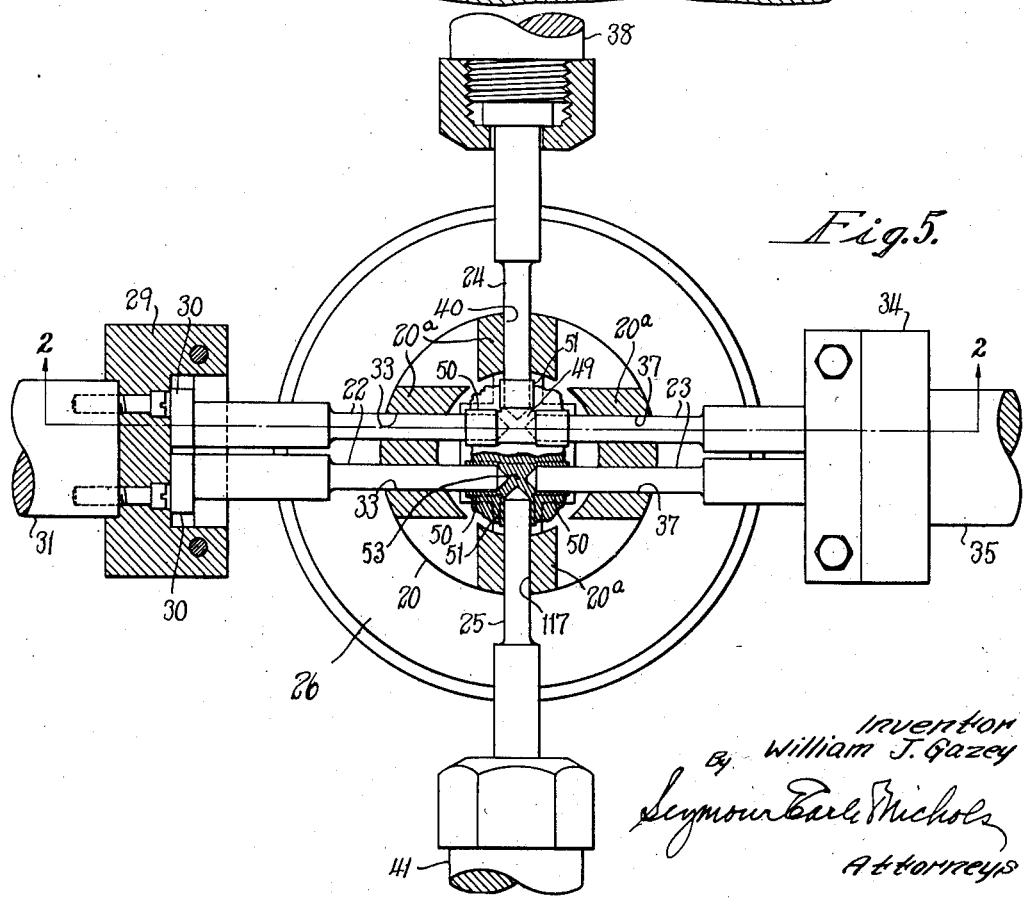
Fig. 5 is a horizontal sectional view on line 5—5 of Fig. 4.

The current now passes through the solenoid 109 and lifts the valve-plunger 100 against the action of the spring 101 to thus cause the plungers 22, 23, 24 and 25 to move inwardly to the positions shown in Figs. 4 and 5, to pierce the partly-completed forged blank. When the mandrels 22, 23, 24 and 25 reach the inner limit of their movement, the contact-arm 124 carried by the ram-head 34 swings the switch-bar 84 away from its full-line position to the dotted-line position shown in Fig. 1, thus breaking the circuit through the solenoid-coil 99 and permitting the spring 101 to force the valve-plunger 100 down to its original position to cause the rams 31, 35, 38 and 41 to be retracted to their original positions shown in Fig. 1.

When the switch-bar 69 was pulled down by the spring 71 to cause the series of actions just described, the bar-section 72 was at the same time swung upward away from the contacts 74 and 75, thereby breaking the circuit through the electromagnet 78 and releasing the latch-arm 81 to be pulled by the spring 83 until the latch-arm 81 was swung against the stop 125, so that when the contact-arm 124 swings the switch-bar 84 to the dotted-line position in Fig. 1 as just previously described, one end of the switch-bar 84 will push by the cam-face of the latch-arm 81 and be engaged by the latch-face thereof and held in the dotted-line position, with the consequence that the electric circuit through the contact 86 to the solenoid 98 will be broken with the result that the spring 90 will push valve-plunger 89 down to cause the ram 27 to return to its original raised position shown in Fig. 1. But before the ram 27 starts upward, the circuit is completed through switch-bar 84, contact 126, wire 127, electromagnet 128 and wire 129 to cause the electromagnet 128 to swing switch-bar 69 past the cam-face of the latch-arm 66 to its original position shown in Fig. 1. This movement of switch-bar 69 causes switch-bar section 72 to swing down and close the circuit through contacts 74 and 75 to the electromagnet 78 which latter pulls latch 81 back to release switch-bar 84 which is swung by spring 87 to its original full-line position shown in Fig. 1, thus breaking the circuit through contact 126 and making contact with contact 86, ready for another cycle of operations.

The invention may be carried out in other specific ways than that herein set forth without departing from the spirit and essential characteristics of the invention, and the present embodiment is, therefore, to be considered in all respects as illustrative and not restrictive; and all changes coming within the meaning and equivalency range of the appended claims are intended to be embraced therein.

I claim:

1. Apparatus for making a branch-fitting blank having a total of at least three line and branch terminals, comprising: a pair of die-members each of which has a forming-cavity including body and terminal cavity-portions complemental to corresponding cavity-portions in the other die-member, one of the die-members having mandrel-passages the axes of which are approximately in line with the axes of the terminal cavity-portions, said two die-members being mounted on first power means adapted to force the die-members relatively oppositely toward one another against a billet; mandrels adapted to enter said mandrel-passages; and second power means adapted to force the mandrels along the mandrel-passages into terminal cavity-portions and into the billet, to form a branch-fitting blank having hollow-ended terminals; both said power means being interrelated to cause said second power means to force the mandrels into the billet at about the time the die-members arrive nearest each other.

2. Apparatus for making a plurality of three-terminal branch-fitting blanks each having line and branch terminals, comprising: a pair of die-members each of which has two adjacent three-terminal branch-fitting forming-cavities each including body, line and terminal cavity-portions complemental to corresponding cavity-portions in the other die-member, one of the die-members having mandrel-passages the axes of which are approximately in line with the axes of the terminal cavity-portions, said two die-members being mounted on first power means adapted to force the die-members relatively oppositely toward one another against a billet; mandrels adapted to enter said mandrel-passages; and second power means adapted to force the mandrels along the mandrel-passages into the terminal cavity-portions and into the billet, to simultaneously form two three-terminal branch-fitting blanks having hollow-ended terminals; both said power means being interrelated to cause said second power means to force the mandrels into the billet at about the time the die-members arrive nearest each other.

3. Apparatus for making a branch-fitting blank having a total of at least three line and branch terminals, comprising: a pair of die-members each of which has a forming-cavity including body and terminal cavity-portions complemental to corresponding cavity-portions in the other die-member; first power means constructed and arranged to force the die-members relatively oppositely toward one another against a billet and forge the billet to form a partly-completed branch-fitting blank having its said terminals partly completed; a mandrel for each said terminal; and second power means interrelated to said first power means and constructed and arranged to force said mandrels into said partly-completed terminals at about the time the die-members arrive nearest each other, to complete the formation of said terminals.

WILLIAM J. GAZEY.